United States Patent [19]
Raleigh et al.

[11] Patent Number: 5,860,451
[45] Date of Patent: Jan. 19, 1999

[54] FLUID ADMIXTURE SYSTEMS

[75] Inventors: William F. Raleigh, Santa Clarita; Wouter J. Wiersma, Arcadia; Bijan Gidanian, Granada Hills, all of Calif.

[73] Assignee: Teledyne Industries, Inc., Los Angeles, Calif.

[21] Appl. No.: 614,396

[22] Filed: Mar. 12, 1996

[51] Int. Cl.⁶ .................................................. G05D 11/03
[52] U.S. Cl. .......................................................... 137/888
[58] Field of Search .................................. 137/888 I, 889, 137/890, 891, 892, 893, 894, 895

[56] References Cited

U.S. PATENT DOCUMENTS

| | | | |
|---|---|---|---|
| 2,656,648 | 10/1953 | Friedmann | 137/888 X |
| 2,953,160 | 9/1960 | Brazier | 137/892 X |
| 3,304,564 | 2/1967 | Green et al. | 137/889 X |
| 4,210,166 | 7/1980 | Munie | 137/893 X |
| 5,429,156 | 7/1995 | Ueda et al. | 137/888 |

Primary Examiner—Stephen M. Hepperle
Attorney, Agent, or Firm—Robert J. Pugh; Patrick J. Viccaro; Allegheny Teledyne Inc.

[57] ABSTRACT

Apparatus for providing an admixture of first and second fluids has a first body having opposite ends, a chamber between such opposite ends, an inlet for first fluid into that chamber, and an aperture for the admixture at an end of that chamber. That apparatus also includes a second body having an inlet aperture for second fluid spaced from the first body, an outlet aperture spaced inside the chamber from the aperture for the admixture, and a fluid flow channel decreasing in cross-sectional area from the inlet aperture spaced from the first body to the outlet aperture inside the chamber between opposite ends of the first body. Such first and second bodies jointly comprise a flange structure at the first body and between the inlet and outlet apertures of the second body. An admixture flow channel increases in cross-sectional area away from the aperture at the end of the chamber.

20 Claims, 2 Drawing Sheets

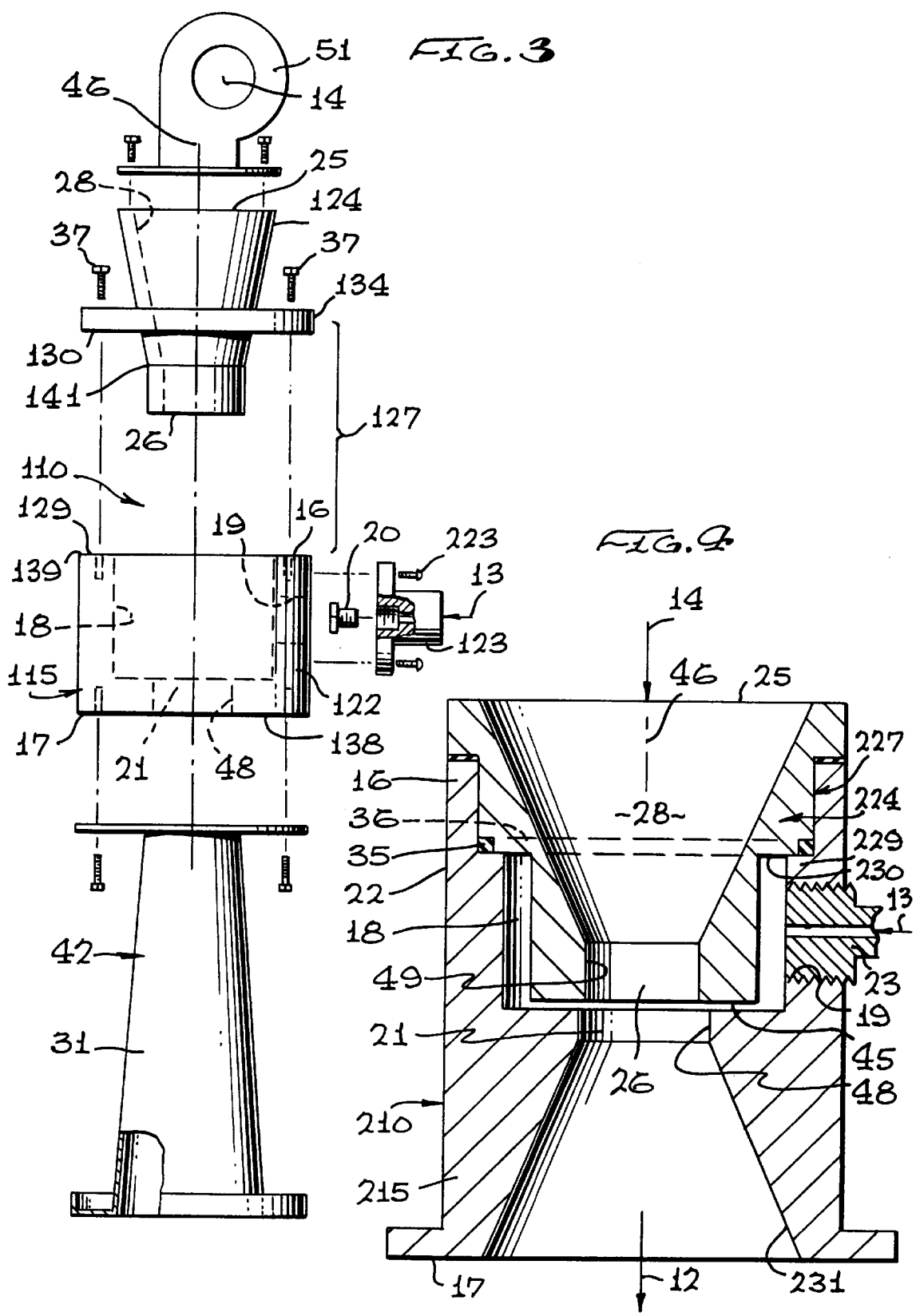

FLUID ADMIXTURE SYSTEMS

FIELD OF THE INVENTION

The subject invention relates to systems and apparatus for providing admixtures of different fluids, and to venturi systems.

BACKGROUND

Venturi and other fluid admixing system and their utility are well known in various fields.

It is an object of the invention to provide improved venturi and other fluid mixing systems for use in agriculture, fluid fuel combustion and other fields where liquid or gaseous chemicals, liquid or gaseous fuels or other fluids are entrained in a stream of water, air or other gaseous or liquid primary fluid.

A related object of the invention is to provide improved venturi or other fluid admixing systems for combustible gas and air in such applications as gas-fired water and other heaters.

SUMMARY OF THE INVENTION

The invention resides in apparatus for providing an admixture of first and second fluids, comprising in combination a first body having opposite ends, a chamber between those opposite ends, an inlet for first fluid into that chamber, and an aperture for the admixture at an end of that chamber, a second body having an inlet aperture for second fluid spaced from the first body, an outlet aperture spaced inside the chamber from the aperture for the admixture, and a fluid flow channel decreasing in cross-sectional area from the inlet aperture spaced from the first body to the outlet aperture inside the chamber between opposite ends of the first body, such first and second bodies jointly comprising a flange structure at the first body and between the inlet and outlet apertures of the second body, and an admixture flow channel increasing in cross-sectional area away from the aperture at the end of the chamber. A free space extends from the above mentioned chamber to in between the aperture for the admixture and the outlet aperture inside that chamber along substantially parallel walls encompassing that aperture for the admixture and that outlet aperture transversely to a longitudinal axis through the first and second bodies and through that aperture for the admixture and through that outlet aperture inside that chamber. The above mentioned inlet for first fluid issues into that chamber upstream of the free space extending from that chamber to in between that aperture for the admixture and that outlet aperture inside that chamber.

BRIEF DESCRIPTION OF THE DRAWINGS

The subject invention and its various aspects and objects will become more readily apparent from the following detailed description of preferred embodiments thereof, illustrated by way of example in the accompanying drawings, which also constitute a written description of the invention, in which like reference numerals designate like or equivalent parts, and in which:

FIG. 3 is an exploded view similar to FIG. 1, of a venturi or other fluid admixture apparatus according to a related embodiment of the invention; and FIG. 4 is a side view, partially in section, of a venturi or other fluid admixture apparatus according to a further embodiment of the invention.

DESCRIPTION OF PREFERRED EMBODIMENTS

The drawings describe and show Venturi systems and other apparatus 10, 110, 210 for providing an admixture 12 of a first fluid 13 with a second fluid 14.

Figure 1:
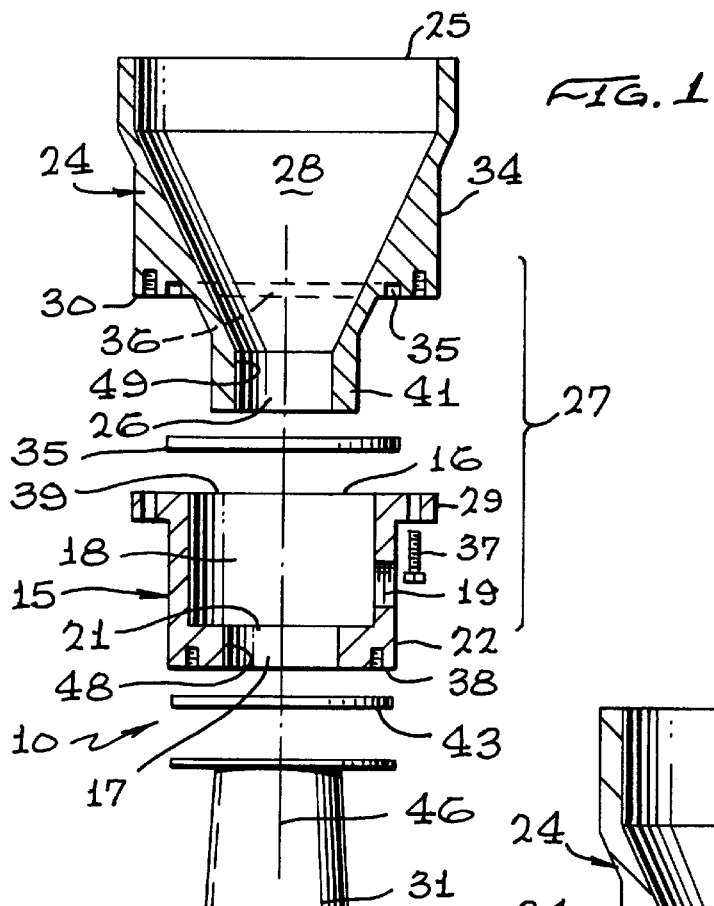
FIG. 1 is an exploded view of a venturi or other fluid admixture apparatus according to an embodiment of the invention.
Figure 2:
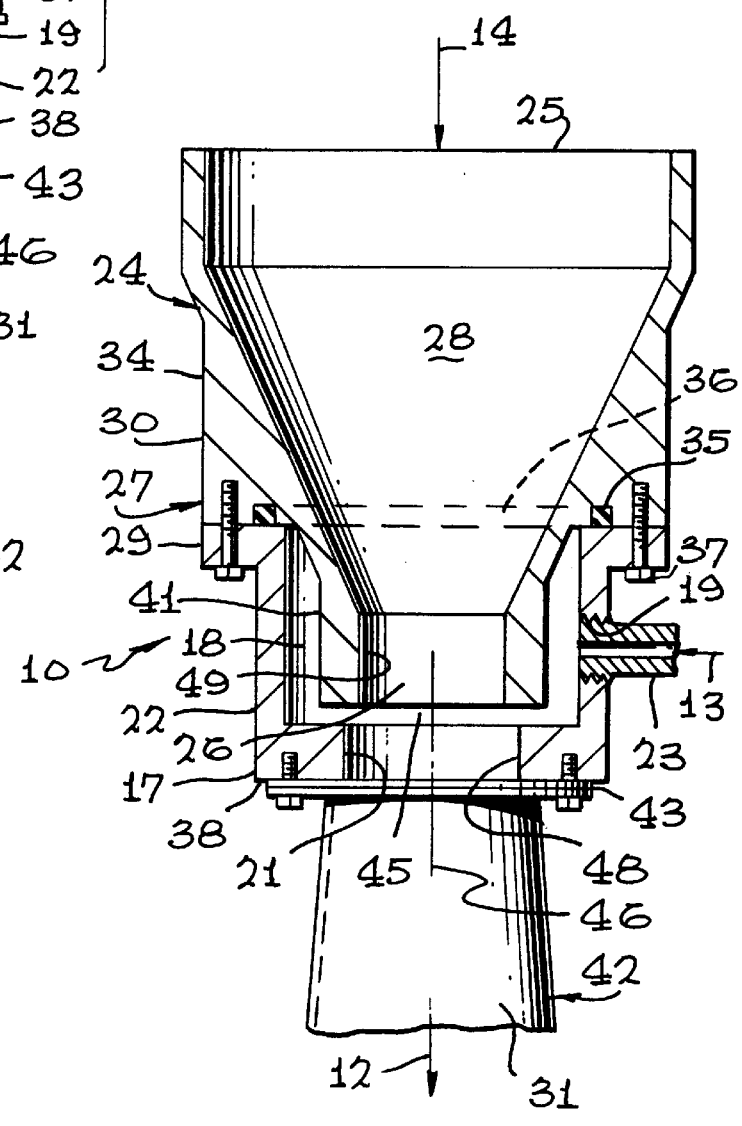
FIG. 2 is a side view, partially in section, of a venturi or other fluid admixture apparatus according to an embodiment of the invention, such as obtained by assembling the parts shown in FIG. 1.

Such apparatus comprises a first body 15, 115 or 215 having opposite ends 16 and 17, a chamber 18 between such opposite ends, an inlet 19 for first fluid 13 into that chamber, and an aperture 21 for the admixture 12 at an end of that chamber inside the first body 15, 115 or 215, such as near the end 17 of the first body 15 or 115 in the embodiments of FIGS. 1 to 3.

The first-fluid inlet 19 may be in a side wall 22 of the first body between its opposite ends 16 and 17. A nipple 23 may be threaded into that side wall and may accommodate a pipe (not shown) that supplies the first fluid 13 to the mixing chamber 18. A metering orifice 20 may be provided in the nipple 23 or in a similar structure 123, such as shown in FIG. 3. While a threaded nipple, such as shown in FIGS. 2 and 4, may be used in all embodiments, the nipple may be attached to the first body by screws or other fasteners, such as shown at 223 for FIG. 5. Reverting to FIG. 2, the threaded nipple 23 may be a short pipe with external threads on both ends and an internal thread on the end nearest the venturi or chamber 18. A gas injection orifice 20, such as shown in FIG. 3, may be screwed into that internal thread (not shown).

The combination presently disclosed also includes a second body 24, 124 or 224 which, however, may be first in the direction of fluid flow 14, while the above mentioned first body 15, 115 or 215 may be second in such direction of fluid flow.

In either case, the second body 24, 124, 224 has an inlet aperture 25 for second fluid 14 spaced from the first body 15, 115 or 215, an outlet aperture 26 spaced inside chamber 18 from the aperture 21 for the admixture 12, and a fluid flow channel 28 decreasing in cross-sectional area from the inlet aperture spaced from first body 15, 115 or 215, to the outlet aperture 26 inside chamber 18 between opposite ends 16 and 17 of first body 15, 115 or 215.

The first and second bodies 15, 115 or 215, and 24, 124 or 224 jointly comprise a flange structure 27, 127 or 227 at one of the ends, such as at the end 16, of first body 15, 115 or 215, and between the inlet and outlet apertures 25 and 26 of second body 24, 124 or 224.

An admixture flow channel 31 or 231 increases in cross-sectional area away from the aperture 21 at the above mentioned end of the chamber 18 as in FIGS. 1 to 4, which may be the end 17, of first body 15, 115 or 215, such as in FIGS. 1 to 3.

According to an embodiment of the invention, the flange structure 27, 127 or 227 has a first flange 29, 129 or 229 on or formed of the first body 15, 115 or 215, such as at its end 16, and a mating second flange 30, 130 or 230 on the second body 24, 124 or 224 between inlet and outlet apertures 25 and 26 of the second body.

The first flange 29 or 229 may project radially from the first body 15 or 215, such as at its end 16. A second flange 30, 130 or 230 may project radially from the second body 24, 124 or 224 between the inlet and outlet apertures 25 and 26 of that second body. Such second flange may mate with the first flange 29, 129 or 229 or with the end 16 of the first body 15, 115 or 215. The flanges 229 and 230 may include stepped portions of the first and second bodies.

Such second body 24, 124 or 224 may have a substantially cylindrical outer portion 34, 134 or 234 having a radial surface as part of the second flange 30, 130 or 230. However, in embodiments such as shown in FIGS. 1 and 2, the outer portion 34 may be undercut or relieved between lugs where fasteners are provided at 30.

The flange structure 27, 127 or 227 may be provided with a gasket between the first and second flanges 29, 129 or 229 and 30, 130 or 230. FIGS. 1, 2 and 4 show such a gasket 35 as partially provided in a circular groove 36 encompassing part of the second body 24 or 224. Conventional fasteners 37 may be used to tie the flanges together.

According to a preferred embodiment of the invention, the first body 15 or 115 is a cup containing the chamber 18. Such cup may include a bottom 38 or 138 having the aperture 21 for the admixture 12 therein, such as at the end 17, a rim 39 or 139 opposite that bottom, such as at the end 16, as part of the flange structure 27 or 127 or flange 29 or 129, and a side wall 22 or 122 between that rim and that bottom having the inlet 19.

According to an embodiment of the invention, the second body 24 or 124 sits on the rim 39 or 139 and has a portion 41 or 141 projecting into cup 15 or 115 and having its outlet aperture 26 spaced in that cup from the aperture 21 for the admixture 12, such as seen at 45 in FIG. 2 but also intended for the embodiment of FIG. 3 when the embodiment is assembled in the manner shown in FIG. 2.

Pursuant to an embodiment of the invention, the first body 15 or 115 has a tailpipe 42, and such tailpipe of the first body defines the admixture flow channel 31. Alternatively, as shown in FIG. 4, the admixture flow channel 31 may be machined, cast or otherwise provided in the first body 215.

The rate of divergence of the admixture flow channel or tailpipe determines the pressure recovery efficiency.

Recovery of static pressure is important as it reduces the energy consumption of the admixture process. In practice, this may, for instance, permit use of a smaller blower for moving the second fluid 14 through the system 10.

A gasket 43 may be provided between first body 15 or 115 and tailpipe 42 at the aperture 21 for admixture 12, such as the end 17.

Gaskets similar to gaskets 35 and 43 may also be used in the embodiment of FIG. 3.

According to a preferred embodiment of the invention, the aperture 21 for the admixture 12 and the outlet aperture 26 inside the chamber 18 are outside of each other; rather than one aperture, such as the aperture 26, being inside the other aperture, such as inside the aperture 21. Preferably, a free space 45 extends between the aperture 21 for the admixture 12 and the outlet aperture 26 inside the chamber 18 in the embodiments of FIGS. 1 to 4. Such free space 45 extends from the above mentioned chamber 18 to in between the aperture 21 for the admixture 12 and the outlet aperture 26 inside that chamber along substantially parallel walls encompassing that aperture 21 for the admixture 12 and that outlet aperture 26 transversely to a longitudinal axis 46 through the first and second bodies 15, 115 or 215 and 24, 124 or 224 and through the aperture 21 for the admixture 12 and through the outlet aperture 26 inside the chamber 18. Such free space 45 encompasses the aperture 21 for the admixture 12 and the outlet aperture 26. The above mentioned inlet 19 for first fluid 13 issues into the chamber 18 upstream of the free space 45 extending from that chamber to in between the aperture 21 for the admixture 12 and the outlet aperture 26 inside that chamber.

According to an embodiment of the invention, the first body 15, 115 or 215 or the aperture 21 for the admixture 12 has at the free space 45 a wall 48 in parallel to a longitudinal axis of that first body; being, for instance, the longitudinal axis 46.

Similarly, or alternatively, the second body 24, 124 or 224 or the outlet 26 has at the free space 45 a wall 49 in parallel to a longitudinal axis of that second body; being, for instance, the longitudinal axis 46.

Presence of such parallel or cylindrical wall section 49 stablizes flow in an axial direction (14) and tends to make the so-called vena contracta or effective minimum cross section of the aperture 26, and therefore the discharge coefficient larger. This stability is desireable, but there may be circumstances in which one would choose to sacrifice the feature to conserve space (length), for example.

Pursuant to a preferred embodiment of the invention, the aperture 21 for the admixture 12 is wider than the outlet aperture 26. Such wider aperture may have a wall 48 in parallel to a longitudinal axis 46 of the first body 15, 115 or 215. Similarly or alternatively, the then narrower outlet aperture 26 may have a wall 49 in parallel to the longitudinal axis through the second body 24, 124 or 224, which may be the longitudinal axis of the apparatus 10.

The cross-sectional area discontinuity between apertures 21 and 26 improves the admixture of fluids 13 and 14, such as by creation of a small eddy or turbulence at free space 45. By way of example, the diameter ratio between apertures 21 and 26 may be on the order of 0.8.

By way of example, the ratio of the height of the free space 45 between adjacent ends of bodies 15, 115 or 215 and 24, 124 or 224, and the diameter of the outlet aperture 26 of the fluid 14 may be on the order of 0.1.

For ease of manufacture and operation, the components 15, 115 or 215, 24, 124 or 224, and 42 of the apparatus 10, 110 or 210 may be rotationally symmetrical about the longitudinal axis 46 as shown in the drawings.

By way of example of a specific utility of the invention, but without limitation to such example, the first fluid 13 may be combustible gas, and the second fluid 14 may be air. The orifice structure 20 or 23 may be connected to a gas regulator or may otherwise supply a combustible gas 13 via chamber 18 and space 45 to force-fed air 14 in between the first and second fluid flow channels 28 and 31 or their apertures 26 and 21.

A burner (not shown) may be connected to the second fluid flow channel 31 for combustion of an air/gas mixture supplied by that second fluid flow channel 31.

A heat exchanger (not shown) may be associated with that burner, such as for heating air, water or another fluid with products of combustion. A combustion chamber (not shown) may be provided for the burner and heat exchanger assembly.

An air-force-feeder or other first fluid-feeder for the apparatus 10 may, for instance, include an air blower or fluid pump, such as shown 51 in FIG. 3, issuing into the first fluid flow channel 28 and adapted to forcefeed substantially all air or other fluid needed for combustion of the air/gas mixture at the burner or otherwise needed for operation of a given system.

Alternatively, air or other fluid 14 may in effect be force-fed to the apparatus 10 by an exhaust fan or pump (not shown) connected to the second fluid flow channel 31, such as via a combustion or exhaust chamber or other admixed fluid utilization apparatus.

By way of example, the invention may be practiced with various burners, including those disclosed, claimed or referred to in U.S. Pat. No. 5,380,192, by Robert E. Hamos, filed Jul. 26, 1993, issued Jan. 10, 1995 to the common assignee hereof, for High-Reflectivity Porous Blue-Flame Gas Burner, and herewith incorporated by reference herein.

The apparatus herein disclosed may be operated according to the methods disclosed in U.S. Pat. No. 5,431,557, by Robert E. Hamos, issued Jul. 11, 1995 to the common assignee hereof, for Low NOx Gas Combustion Systems, and herewith incorporated by reference herein.

The invention may also be practiced pursuant to, and may be substituted for venturi systems in, the methods and systems disclosed in U.S. patent application Ser. No. 08/313,090, by William F. Raleigh, one of the co-inventors hereof, filed Sep. 29, 1994, for Fluid Mixing Systems and Gas-Fired Water Heater, and assigned to the common assignee hereof, and disclosed in its Patent Cooperation Treaty parent Application PCT/US93/11,500, by Teledyne Industries, Inc., the common assignee hereof, and by said William F. Raleigh, filed 29 Nov. 1993, published 1 Jun. 1995, and being herewith incorporated by reference herein.

Moreover, the subject extensive disclosure will render apparent or suggest to those skilled in the art various modifications and variations within the spirit and scope of the invention.

I/we claim:

1. In apparatus for providing an admixture of first and second fluids, the improvement comprising in combination:

a first body having opposite ends, a chamber between said opposite ends, an inlet for first fluid into said chamber, and an aperture for said admixture at an end of said chamber;

a second body having an inlet aperture for second fluid spaced from said first body, an outlet aperture spaced inside said chamber from said aperture for said admixture, and a fluid flow channel decreasing in cross-sectional area from said inlet aperture spaced from said first body to said outlet aperture inside said chamber between said opposite ends of said first body;

said first and second bodies jointly comprising a flange structure at said first body and between said inlet and outlet apertures of said second body;

an admixture flow channel increasing in cross-sectional area away from said aperture at said end of said chamber; and a free space extending from said chamber to in between said aperture for said admixture and said outlet aperture inside said chamber along substantially parallel walls encompassing said aperture for said admixture and said outlet aperture transversely to a longitudinal axis through said first and second bodies and through said aperture for said admixture and through said outlet aperture inside said chamber;

said inlet for first fluid issuing into said chamber upstream of said free space extending from said chamber to in between said aperture for said admixture and said outlet aperture inside said chamber.

2. Apparatus as in claim 1, wherein:

said flange structure has a first flange on said first body, and a mating second flange on said second body between said inlet and outlet apertures of said second body.

3. Apparatus as in claim 2, wherein:

said flange structure has a first flange projecting radially from said first body, and a mating second flange projecting radially from said second body between said inlet and outlet apertures of said second body.

4. Apparatus as in claim 3, including:

a gasket between said first and second flanges.

5. Apparatus as in claim 1, wherein:

said first body is a cup containing said chamber; and said cup includes a bottom having said aperture for said admixture therein, a rim opposite said bottom as part of said flange structure, and a side wall between said rim and said bottom having said inlet.

6. Apparatus as in claim 5, wherein:

said second body sits on said rim and has a portion projecting into said cup and having said outlet aperture spaced in said cup from said aperture for said admixture.

7. Apparatus as in claim 1, including:

a tailpipe of said first body defining said admixture flow channel.

8. Apparatus as in claim 7, including:

a gasket between said first body and said tailpipe at said aperture for said admixture.

9. Apparatus as in claim 1, wherein:

said aperture for said admixture and said outlet aperture inside said chamber are outside of each other.

10. Apparatus as in claim 1, wherein:

said aperture for said admixture is wider than said outlet aperture and said wider aperture for said admixture has a wall in parallel to a longitudinal axis of said first body.

11. Apparatus as in claim 10, wherein:

said outlet aperture has a wall in parallel to a longitudinal axis through to said second body.

12. Apparatus as in claim 1, wherein:

said first body has at said free space a wall in parallel to a longitudinal axis of said first body.

13. Apparatus as in claim 12, wherein:

said second body has at said free space a wall in parallel to a longitudinal axis of said second body.

14. Apparatus as in claim 1, wherein:

said second body has at said free space a wall in parallel to a longitudinal axis of said second body.

15. Apparatus as in claim 1, wherein:

said aperture for said admixture has a wall in parallel to a longitudinal axis of said first body.

16. Apparatus as in claim 15, wherein:

said outlet has a wall in parallel to a longitudinal axis of said second body.

17. Apparatus as in claim 1, wherein:

said outlet has a wall in parallel to a longitudinal axis of said second body.

18. Apparatus as in claim 1, wherein:

said aperture for said admixture is wider than said outlet aperture.

19. Apparatus as in claim 18, wherein:

said outlet aperture has a wall in parallel to a longitudinal axis of said second body.

20. Apparatus as in claim 1, wherein:

said admixture flow channel is in said first body.

* * * * *